US005616194A

United States Patent [19]
Lim et al.

[11] Patent Number: 5,616,194
[45] Date of Patent: Apr. 1, 1997

[54] PNEUMATIC RADIAL TIRE HAVING A TREAD PATTERN

[75] Inventors: Nack-Hyun Lim; Young-Cheol Kim; Bong-Wha Kim, all of Kwangju, Rep. of Korea

[73] Assignee: Kumho & Co., Inc., Seoul, Rep. of Korea

[21] Appl. No.: 305,936

[22] Filed: Sep. 19, 1994

[30] Foreign Application Priority Data

Sep. 20, 1993 [KR] Rep. of Korea .......................... 18917
Sep. 20, 1993 [KR] Rep. of Korea .......................... 19051

[51] Int. Cl.⁶ .................... B60C 101/00; B60C 103/00
[52] U.S. Cl. ............................. 152/209 R; 152/209 D
[58] Field of Search .......................... 152/209 R, 209 A, 152/209 D; D12/146, 147, 148

[56] References Cited

U.S. PATENT DOCUMENTS 4,702,292  10/1987  Brayer .............................. 152/209 R
5,135,038   8/1992  Graas et al. ...................... 152/209 R
5,240,053   8/1993  Baumhofer et al. .............. 152/209 R
5,287,905   2/1994  Caretta et al. .................... 152/209 R
5,353,855  10/1994  Kajiwara et al. ................. 152/209 R

FOREIGN PATENT DOCUMENTS 3600618   7/1987  Germany ......................... 152/209 R
 178808   8/1991  Japan ............................... 152/209 D
1418171  12/1975  United Kingdom ............. 152/209 R

*Primary Examiner*—Steven D. Maki
*Attorney, Agent, or Firm*—Lowe, Price, LeBlanc & Becker

[57] ABSTRACT

A pneumatic radial tire provides enhanced noise reduction and water releasing ability during driving by repetitious process of trapping air into the circumferential groove, formed on the tread as the air therein gets compressed and expanded before it gets released. The pneumatic tire includes a rib-lug tread pattern formed by circumferential grooves and several axial grooves at a slant angle relative to the circumferential grooves.

18 Claims, 5 Drawing Sheets

PNEUMATIC RADIAL TIRE HAVING A TREAD PATTERN

BACKGROUND OF THE INVENTION

The present invention relates to pneumatic radial tires for passenger cars, and particularly relates to tires which are contrived to prevent hydroplaning and reduce noise by having a unique tread pattern.

In the prior art, rib-lug type tire, many of ribs are generally formed between several circumferential grooves formed along the middle of the tread and several generally axial grooves which have a certain slant angle to those circumferential grooves form numerous lugs in a certain pitch.

Tires with such rib-lug type tread pattern do not have quiet-smooth driving as a result of its contact with the ground. The contact between tire and ground traps air inside of above-mentioned circumferential grooves and the air is compressed. As this process takes place repetitiously it yields the high frequency noise, approximately 1 KHz, thus, such phenomenon becomes severe during high-speed driving or under heavy load.

In order to reduce such noise, conventional tires tried to change the pitch of lug or width of grooves, but this effort was not effective to mitigate the air pumping noise caused by constant air flow process of trapping, compressing and releasing. Also, as a concomitant phenomenon, inappropriate juxtaposition of ribs and/or lugs resulted in applying concentrated load on a particular area which led to biased abrasion or abnormal abrasion.

As one of the objectives of the present invention, it is to provide tire tread pattern reducing air pumping noise without accompanying biased abrasion or abnormal abrasion of ribs and/or lugs.

On the other hand, tread pattern which is distinguished by grooves and/or sipes releases water as tire is utilized during rainy weather or on damp road surfaces, beside providing braking and/or ground gripping power. However, if water trapped inside of grooves is not promptly and sufficiently released or dispersed, it could jeopardize safe driving of the vehicle by causing hydroplaning. Accordingly, designing of tire tread pattern needs to be done to provide improvement of anti-hydroplaning and wet road performance beside reducing of noises.

Therefore, another objective of the present invention is to provide a tire tread pattern which will prevent tires from causing hydroplaning when they are utilized on wet road surface or in rainy weather.

In order to accomplish above mentioned first and second objective of the present invention, as the distinctive features of the invention, the tire manufactured according to the present invention has circumferential grooves and several generally axial grooves capable of inducing and releasing trapped air therein sufficiently through the grooves by allocating equal ground contact pressure to ribs and/or lugs. Also, the tread pattern according to the present invention forms characteristically a number of auxiliary grooves on a ground contacting surface of the tread in order to release or disperse the remaining exceeding water from main grooves through above mentioned auxiliary grooves.

The other unique and advantageous features of the present invention can be better perceived in the following detailed description of the invention.

DETAILED DESCRIPTION OF THE INVENTION

Figure 1:
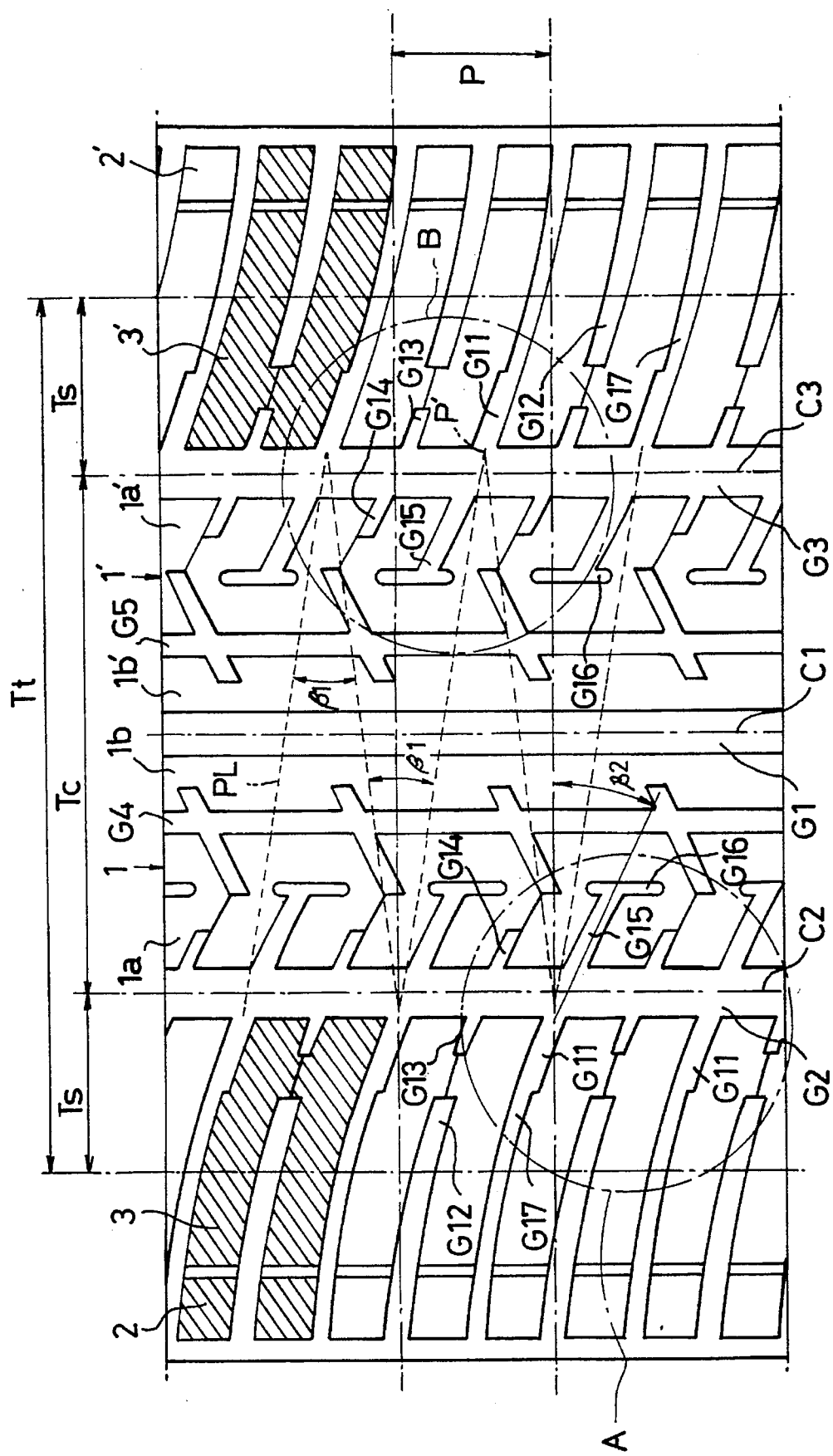
FIG. 1 is the tread pattern of pneumatic radial tire according to a preferred embodiment of the present invention.

FIG. 1 is a drawing of the tread pattern of a pneumatic radial tire manufactured in accordance with the present invention where tread comes into contact with the ground. The tread is divided into entire ground contacting tread area Tt, central ground contacting tread area Tc and both shoulder side ground contacting tread areas Ts.

The central ground contacting tread area Tc is the area between right and left side circumferential grooves G2, G3 as it is distinguished from shoulder side ground contacting tread areas Ts with its desirable range of about $0.3Tt<Tc<0.7Tt$.

The reasons for its desirable location of above-mentioned central ground contacting tread area Tc relative to the entire ground contacting tread area Tt are that if its location exceeds the above mentioned distance range, the area difference between ribs on the central ground contacting tread area Tc and lugs on the shoulder side ground contacting area Ts increases. This increase in side ground contacting area Ts creates an uneven allocation of ground contact pressure which hinders noise reduction.

Also, ribs 1 and 1' are formed by circumferential groove G1 formed along the center line C1 of the ground contacting tread area Tc. Aforesaid ribs 1 and 1' are further divided into Parts 1a and 1b, as well as parts 1b' and 1a' by circumferential grooves G4 and G5, respectively.

Lugs 3 and 3' are formed by grooves G11 which have a certain slanted angle to both shoulder side lugs 2 and 2' from circumferential grooves G2 and G3 and are connected linearly with generally axial grooves G17. Lugs 3 and 3' are formed repeatedly along the circumferential direction of the tread with a certain pitch P. Right side lugs 3' are formed by 180°-rotation, with axis of the center line C1, of left side lugs 3.

In the middle of each the above mentioned lugs 3 and 3', short generally axial grooves G13 are connected inwardly to the circumferential grooves G2 and G3 and long generally axial grooves G12 run through the shoulder side ribs 2 and 2'.

On the other hand, on outer left and right ribs 1a and 1a', short generally axial grooves G14 and long generally axial grooves G15, which have a certain slanting angle β2 to the generally axial direction of the tread are formed alternately along the circumferential direction. Grooves G15 and auxiliary grooves G16, described in detail later, contribute to the anti-hydroplaning character of the tire.

Figure 3:
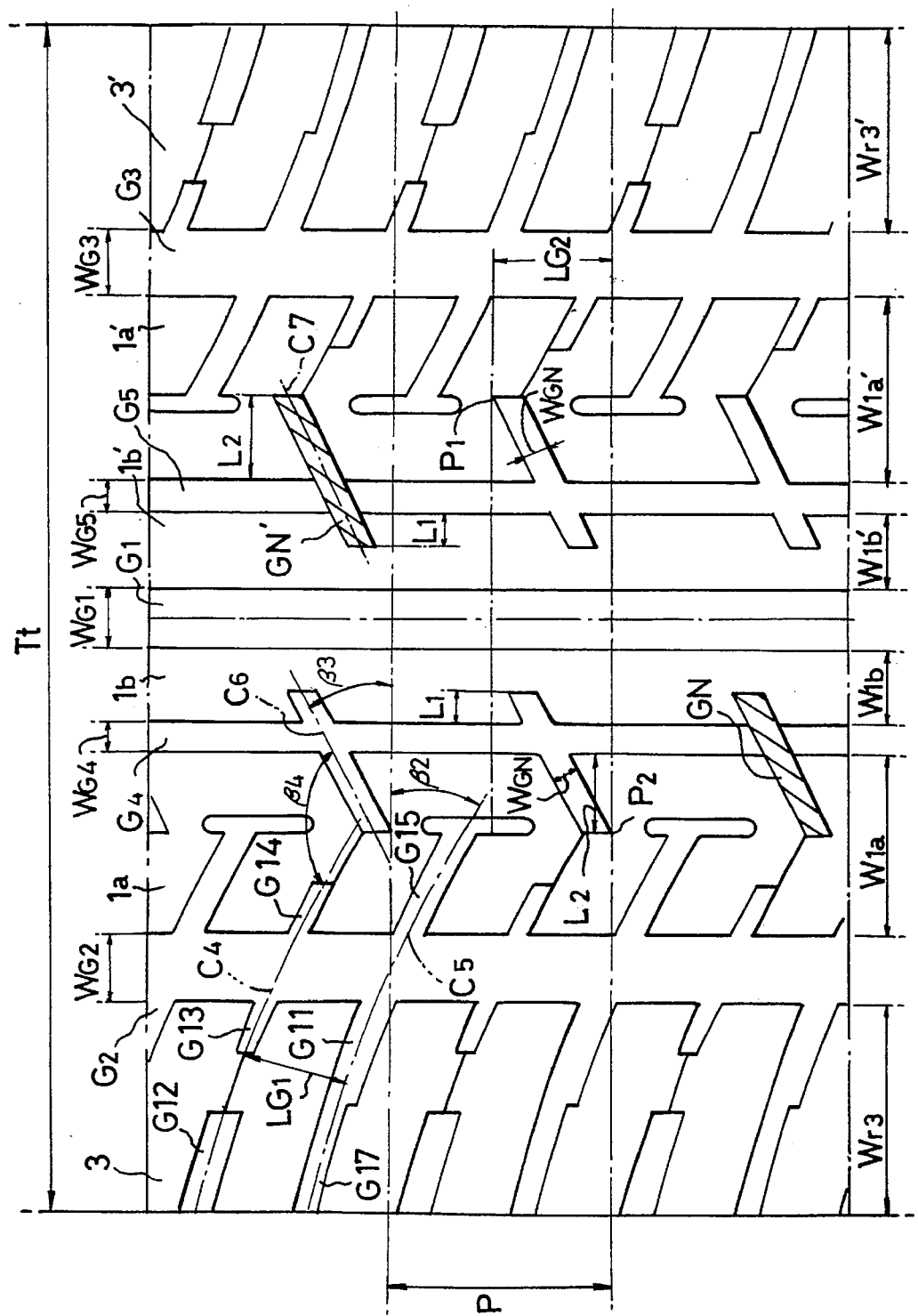
FIG. 3 is a magnified view of ground contacting surface of tread in FIG. 1.

As shown in FIG. 3, it is desirable for said generally axial grooves G12, G13 and G14 to be located on their common center line C4; also, said generally axial grooves G11, G15 and G17 would be desirable to be located on their common center line C5; and the above mentioned center lines C4 and C5 are practically parallel and desirably have radius of 150 mm to 200 mm and the vertical distance LG1 therebetween has its proportional range of about $0.35P \leq LG1 \leq 0.55P$ relative to the pitch P of lugs 3 and 3'. This is to efficiently diffuse air and to expedite dispersing or releasing water while the tire is used on wet road surface.

Lugs 3', as shown on the right side of FIG. 1, are so biasely formed from the left side, if when phantom lines PL are drawn between inner centers of the adjacent lugs 3, 3 shown on the left side and inner centers of the adjacent lugs 3', 3' shown on the right side of FIG. 1 that the lines PL will show the form of zig-zag lines. The intersecting angle $\beta 1$ formed by the zig-zag lines PL would be desirable to have its range of about $10° \leq \beta 1 \leq 20°$.

The angle $\beta 1$ is determined within this range because if the intersecting angle $\beta 1$ exceeds this range, the generally axial grooves G11 and G17 would end up locating on the same set of line which will deliver impact on lugs 3 and 3' formed by the above mentioned radial grooves G11 and G17, thus, result in increasement of noises and abnormal abrasion or biased abrasion.

Further, it is concluded that slanted angle $\beta 2$ range of each groove G11–G17 to the axial direction of the tread is about $1.3\beta 1 \leq \beta 2 \leq 2.0\beta 1$.

The reasons for above range of slanted angle $\beta 2$ are that if the angle is below about $1.3\beta 1$, the braking ability of the tire will be decreased when driving on the wet road surface due to insufficient release or dispersion of water trapped inside of generally axial groove G15 even though strength deterioration of ribs 1 and 1' and lugs 3 and 3' would not occur, and if the angle $\beta 2$ exceeds about $2.0\beta 1$, it will enable the tire to promptly release trapped water, however, the noise from the tire will be increased either by the deteriorated strength of ground contacting ribs 1 and 1' or side surface of lugs 3 and 3'.

On the other hand, as shown in FIG. 3, the tire tread according to the present invention has generally axial grooves GN which extend over both the ribs 1a and 1b, one end of said generally axial grooves GN being located between the adjacent auxiliary circumferential grooves G16 and G16 and the other end of said grooves GN being located in the substantially middle of the ribs 1b. Said generally axial grooves GN have a slanted angle $\beta 3$ with respect to the radial direction of the tread and form crosses with the circumferential grooves G4. Also, in the same manner, generally axial grooves GN' are so formed as to extend over both the ribs 1a' and 1b' with their center lines C7 being substantially parallel to the center lines C6 of said generally axial grooves GN and thus to form crosses with the circumferential grooves G5. The center lines C6 of the generally axial grooves GN or GN' and the generally axial grooves G12 or G17 make a crossed angle $\beta 4$ therebetween. The slanted angle $\beta 3$ of the center lines C4 of the generally axial groove GN or GN' is desirably defined as about $20° \leq \beta 3 \leq 40°$ and said crossed angle $\beta 4$ is desirably defined as about $100° \leq \beta 4 \leq 130°$. By the range of said angles $\beta 3$, $\beta 4$ described above, it is possible to increase the steering ability of the vehicle without deteriorating the strength of the ribs 1, 1' or lugs 3, 3'.

When the area of per said pitch P of the circumferential groove G2 or G3, called A1, and sum of area per pitch P of generally axial grooves G11–G17 which communicate with the circumferential groove G2 or G3 is called A2, the ratio between A1 and A2 is concluded as about $0.8 \leq A1/A2 \leq 0.95$.

If the ratio between area A1 and A2 is concluded as above, the amount of air trapped in circumferential grooves G2 or G3, and the amount of air allocated by the generally axial grooves G11–G17 are substantially equal which will contribute to the pumping noise reduction.

Figure 2:
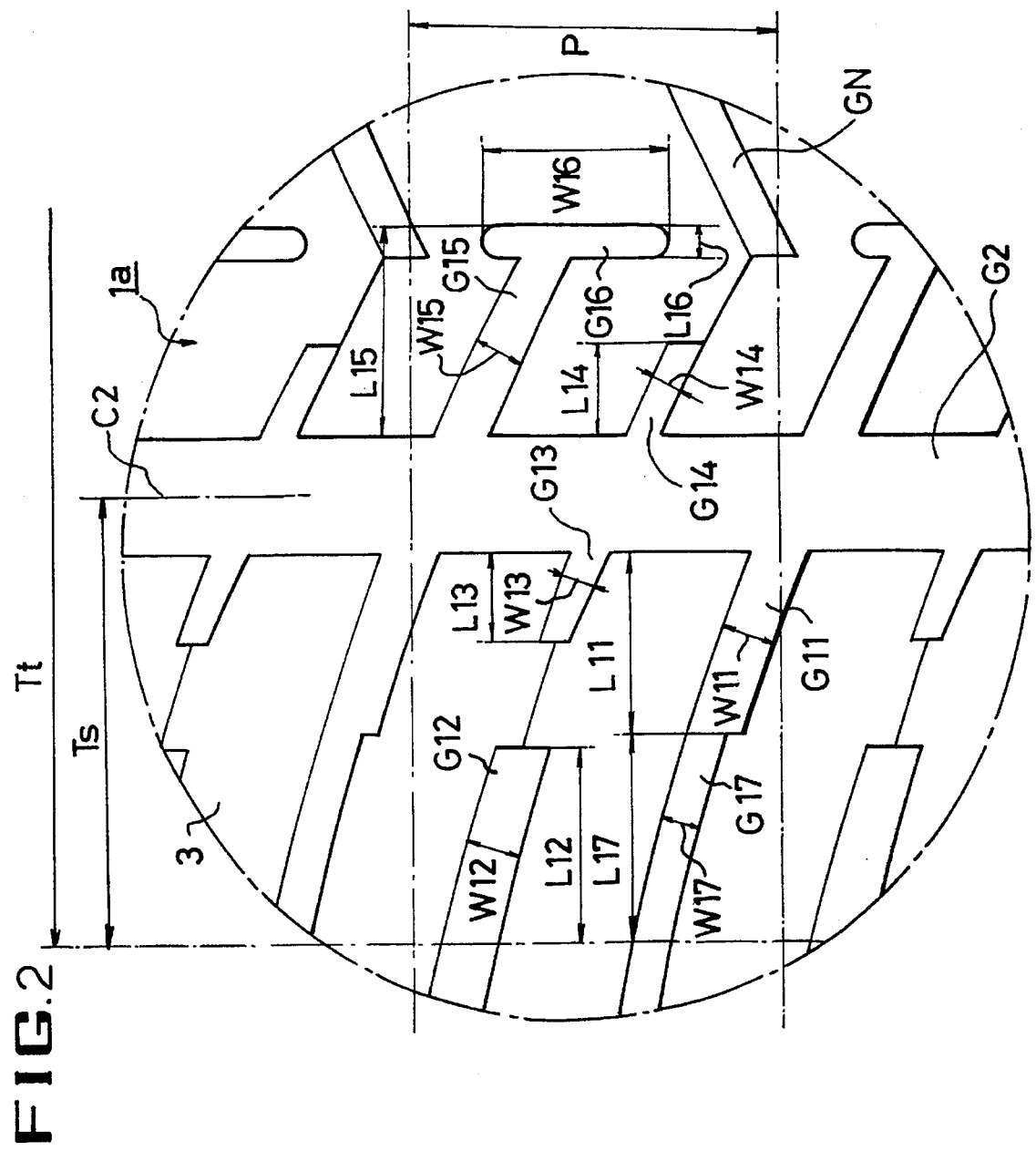
FIG. 2 is a magnified view of part A of FIG. 1.

As shown in FIG. 2, according to the above ratio, the relative ratio of vertical lengths L11–L17 of each corresponding groove G11–G17 located on entire ground contacting tread Tt is defined as about: L11: L12: L13: L14: L15: L16: L17=1.0: 1.0: 0.4–0.6: 0.4–0.6: 1.0–1.2: 0.1–0.3: 1.0–1.2. In generally axial grooves G11–G17, the ratio of their widths W11–W17 is defined as about: W11: W12: W13: W14: W15: W16: W17=1.0: 1.0–1.2: 0.5–0.7: 0.5–0.7: 1.0: 3.2–3.8: 0.50–0.7.

Also, as shown in FIG. 3, the relative ratio of widths W1b, W1b', W1a, W1a', Wr3, and Wr3' in ribs 1b, 1b', 1a, 1a' and lugs 3, 3', located on entire ground contacting tread Tt is defined as about: W1b: W1b': W1a: W1a': Wr3: Wr'3=1.0: 1.0: 2.3–2.7: 2.3–2.7: 2.8–3.2: 2.8–3.2.

Further, the relative ratio of the width WG1, WG2, W3, W4, and WG5 of the circumferential grooves G1, G2, G3, G4 and G5 is defined as about: WG1: WG2: WG3: WG4: WG5=1.0: 0.9–1.3: 0.9–1.3: 0.3–0.7: 0.3–0.7.

On the other hand, the circumferential distance LG2 between the lower end P2 of the generally axial groove GN formed in the left side rib 1 and the upper end P1 of the generally axial groove GN' formed in the right side rib 1' is, comparing with the lug's pitch P, desirably decided to be in the ratio of about $0.35P \leq LG2 \leq 0.55P$. Further, the vertical distance L1 between the upper end of the generally axial groove GN and the circumferential groove G4 or between the lower end of the generally axial groove GN' and the circumferential groove G5 is preferably defined to be in the ratio of about $0.35W1b \leq L1 \leq 0.55W1b$, and vertical distance L2 between the lower end of the generally axial groove GN and circumferential groove G4 or between the upper end of the generally axial groove GN' and circumferential groove G5 is preferably defined to be in the ratio of about $0.35W1a \leq L2 \leq 0.55W1a$. Also, the width WGn of said generally axial grooves GN or GN' is formed as about 90–100% of the width WG4 or WG5 of circumferential grooves G4 or G5.

Figure 4:
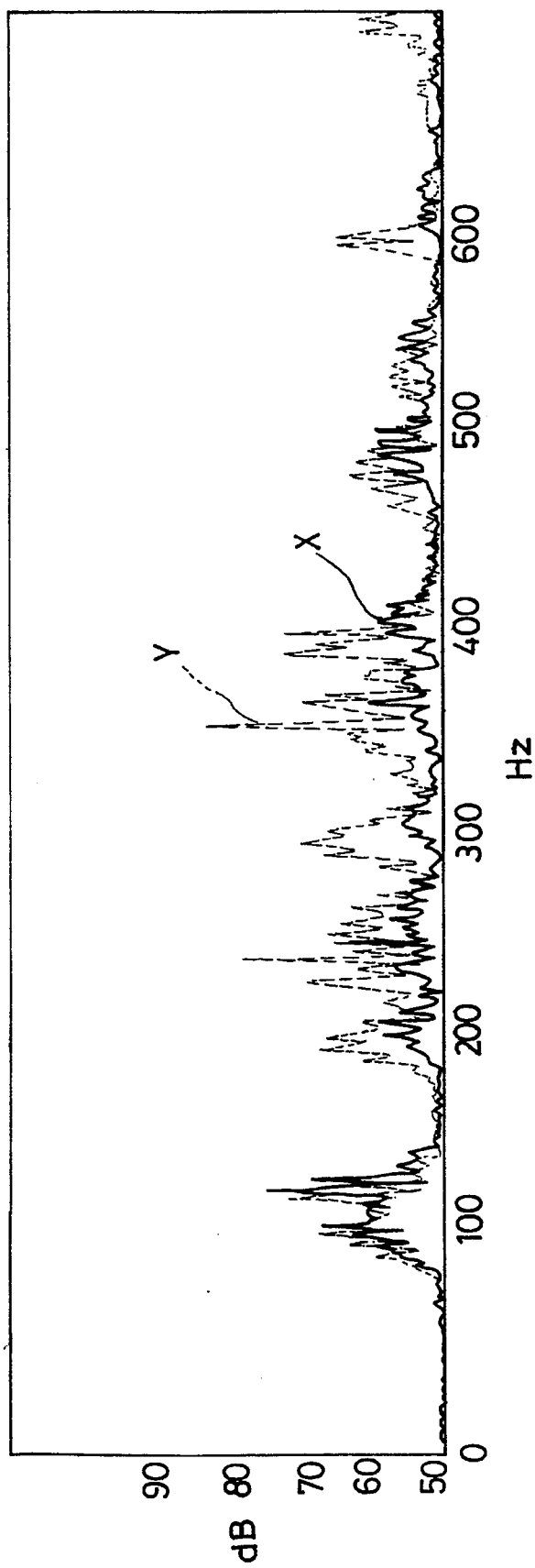
FIG. 4 is a graph of noise vs. time responses of a tire with the tread of FIGS. 1–3 and of a prior art tread reduction test.

The comparative result of noise test in tire manufactured according to present invention and conventional tire PCR 205/60 R15 is referred in FIG. 4.

In FIG. 4, bold line X refers to the noise level produced by the tire made according to the present invention and dotted line Y refers to noise level produced by the conventional tire. From this result, it can be observed in X that the tread pattern of the tire according to the present invention helps the air trapped in the circumferential groove G2, G3 to be substantially and equally allocated and released efficiently through generally axial grooves G11–G17 which indicates prominent decrease in noise level.

Next, it will be explained on auxiliary circumferential grooves G16 which are formed to improve water releasing or dispersing ability of the tire which is made according to the present invention.

Figure 5:
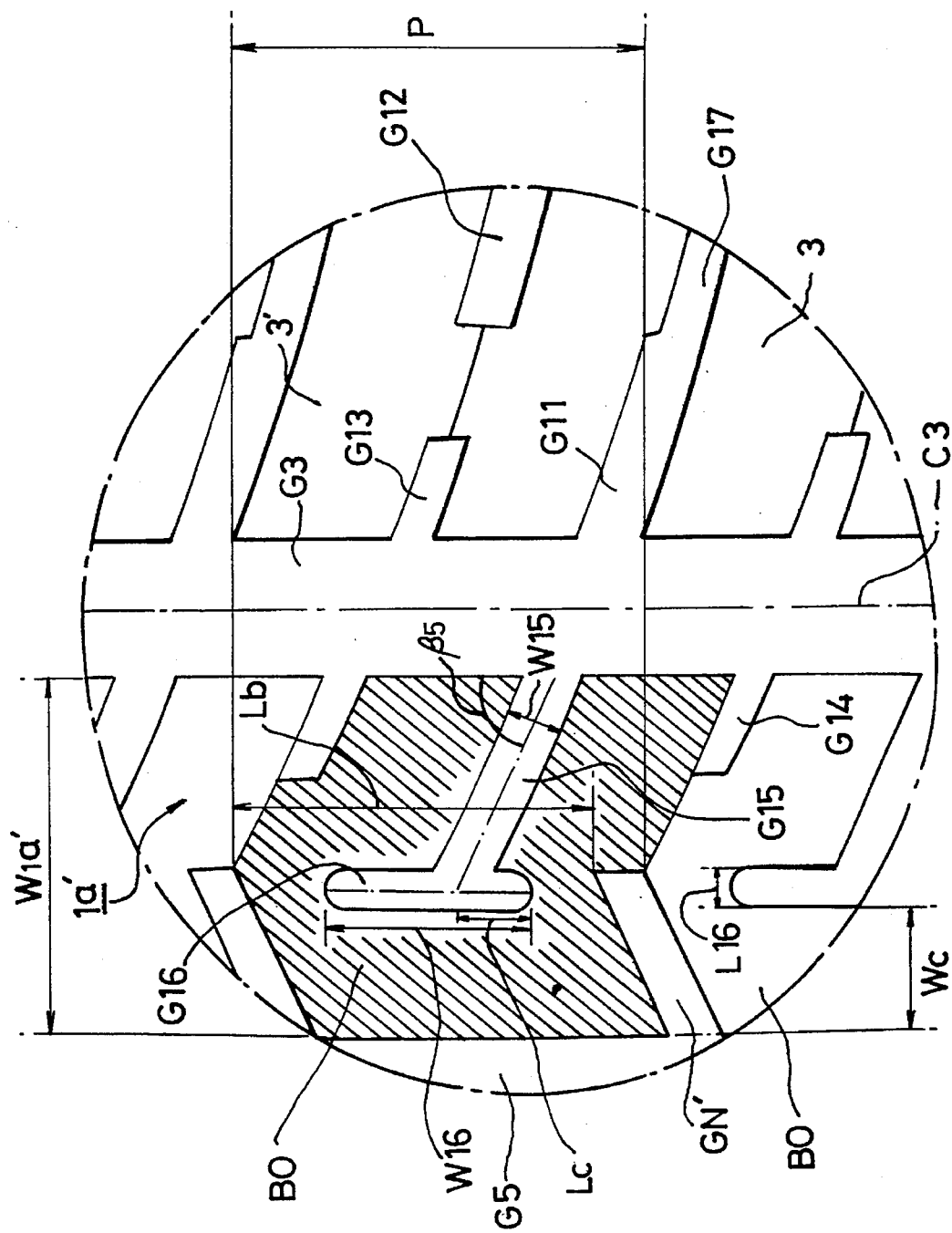
FIG. 5 is a magnified view of part B of FIG. 1.

The tire tread of the present invention has a substantially symmetrical rib-lug pattern along the center line C1 as shown in FIG. 1. As depicted in FIG. 5 which shows magnified view of part B from FIG. 1, rounded auxiliary lugs G16 are formed in the centers of each unit lugs BO of rib line 1a' and generally axial grooves G15 are so formed as to connect those auxiliary grooves G16 with the main circumferential groove G3.

Here, the location WC of above mentioned auxiliary circumferential grooves G16 is about within 35–45% with respect to the generally axial width W1a of block BO, that is, $0.35W1a \leq Wc \leq 0.45W1a$. The width L16 of auxiliary circumferential groove G16 is about within 20–40% of the width W G5 of the circumferential groove G 5 (0.2WG5≦L16≦0.4WG5) and the length W16 of the auxiliary circumferential grooves G16 is about within 45–55% of the circumferential pitch P of the block (0.45P≦W16≦0.55P) and it is about within 55–65% of circumference length Lb of unit block BO (0.55Lb≦W16≦0.65Lb). The depth of the auxiliary circumferential grooves G16, desirably, is about 50–60% of the depth of the main circumferential grooves.

Also, slanted angle β5 of above mentioned radial generally axial grooves G15 is to be located about within 50°–70° with respect to the circumferential direction and the depth of the generally axial grooves G15 is about 80–90% of depth of the circumferential grooves. The width W15 of said generally axial grooves G15 is desirably determined as about 160%–200% of the width L16 of the auxiliary circumferential grooves G16 (1.6L16≦W15≦2.0L16), and the diverging point LC of the generally axial grooves G15 from the auxiliary circumferential grooves G16 is preferably decided to be about 35%–50% of the circumferential length W16 of the auxiliary circumferential grooves G16 (0.35W16≦Lc≦0.5W16) if when measured from one of both ends of said circumferential grooves G16.

If the range exceeds the above mentioned ranges of auxiliary circumferential grooves G16 and generally axial grooves G15, there is possibility of tread weakening as result of the deterioration of ribs and/or lugs on the block which will lead to abnormal abrasion or even cracking during driving. Also, if it falls below the above mentioned ranges, hydroplaning can occur as result of deterred flow of water and insufficient dispersing of water between road surface and ground contacting tread.

Accordingly, as above, the process of water trapped in main circumferential grooves when driving on the wet road surface being efficiently released or dispersed into the circumferential auxiliary circumferential grooves G16 through the above mentioned generally axial grooves G15 serves to prevent hydroplaning. Also, it will improve ground gripping and steering ability of the tire on wet road surface, thus, it will help to eliminate the cause of fatal accidents.

What is claimed is:

1. A pneumatic generally axial tire having a tread pattern, the tread pattern comprising first, second, third and fourth ribs and first lugs and second lugs, an outer main circumferential groove between the first rib and the first lugs, a circumferential groove between the first rib and the third rib, a circumferential groove between the third rib and the fourth rib, a circumferential groove between the fourth rib and the second rib, an outer main circumferential groove between the second rib and the second lugs, several first generally axial grooves with a slant angle of β2 between the first lugs and several second generally axial grooves with a slant angle of β2 between the second lugs, the third and fourth ribs being inside of the first and second ribs, the pattern having a central ground contacting tread area, the central ground contacting tread area having an axial extent Tc which is between the outer circumferential grooves such that 0.3Tt≦Tc≦0.7Tt, where Tt is the total axial length of the ground contacting tread area of the tread pattern, the first and second lugs being biasely formed such that phantom lines extend between inner centers of adjacent ones of the first lugs and inner centers of adjacent ones of the second lugs, the phantom lines forming a zig-zag line and defining an intersecting angle β1 in the range of about 10°<β1<20°, in the middle of each of the first and second lugs first short generally axial grooves connected to the outer circumferential grooves and first long generally axial grooves running through a shoulder of the tread, the first and second ribs having second short generally axial grooves and second long generally axial grooves, the second short and second long grooves being formed alternately along the circumferential direction and extending at the slanted angle β2, the slanted β2 having a value in accordance with about 1.3β1<β2<2.0β1, and auxiliary grooves at each end of the second long generally axial grooves in the first and second ribs.

2. The tire according to claim 1, further including first additional grooves extending from the first generally axial grooves and second additional grooves extending from the second generally axial grooves wherein the area of the first additional grooves, the second additional grooves, the first generally axial grooves between the first lugs, the second generally axial grooves between the second lugs, the first short grooves, the first long grooves, the second short grooves and the second long grooves within a pitch P of the first and second lugs is A2, the area of the outer circumferential grooves within pitch P is A1 and 0.8≦A1/A2≦0.95.

3. The tire according to claim 1, further including additional grooves extending from the first and second additional grooves, wherein the first long grooves, the first short grooves and the second short grooves are formed on a first common center line and the generally axial grooves between the lugs, the additional grooves and the second long grooves are formed on a second common center line, the first and second center lines being substantially parallel.

4. The tire according to claim 3, each of the center lines has a radius of 150 mm–200 mm, the first and second center lines being spaced by a distance Lg1 in the range of about 0.35P<LG1<0.55P, wherein P is the pitch of said first and second lugs.

5. The tire according to claim 1, wherein the first, second third and fourth ribs respectively have widths of W1a, W1a', W1b, W1b' and the first lugs and the second lugs respectively have widths of Wr3 and Wr3', the relative widths of the ribs and lugs being W1b: W1b': W1a: W1a': Wr3: Wr3'=1.0: 1.0: 2.3–2.7: 2.3–2.7: 2.8–3.2: 2.8–3.2.

6. The tire according to claim 1, wherein the circumferential groove between the third rib and the fourth rib, the outer circumferential groove between the first lugs and the first rib, the outer circumferential groove between the second rib and the second lugs, the circumferential groove between the first rib and the third rib, and the circumferential groove between the fourth rib and the second rib respectively have widths of WG1, WG2, WG3, WG4 and WG5 related to each other by: WG1: WG2: WG3: WG4: WG5=1.0: 0.9–1.3: 0.9–1.3: 0.3–0.7: 0.3–0.7.

7. The tire according to claim 1, wherein first further grooves cross the circumferential groove between the first rib and the third rib and extend at a slant angle β3 with respect to the axial direction and second further grooves cross the circumferential groove between the fourth rib and the second rib and extend at a slant angle of β3 with respect to the axial direction.

8. The tire according to claim 7, wherein the slant angle β3 is in a range of about 20°<β3<40°.

9. The tire according to claim 7, wherein the circumferential distance between a lower end of a first further groove and an upper end of an adjacent second further groove is LG2 and wherein 0.35P≦LG2≦0.55P, where P is the pitch of the first and second lugs.

10. The tire according to claim 7, wherein the axial distance between an upper end of one of the first further grooves and the circumferential groove between the first rib and the third rib or between a lower end of one of the second further grooves and the circumferential groove between the fourth and second rib is L1 wherein $0.35W1b \leq L1 \leq 0.55W1b$, where W1$b$ is the width of the third rib; and the axial distance between a lower end of one of the first further grooves and the circumferential groove between the first rib and the third rib or between an upper end of one of the second further grooves and the circumferential groove between the fourth and second rib is L2 wherein $0.35W1a \leq L2 \leq 0.55W1a$, wherein W1$a$ is the width of the first rib; and the width WGN of the first further groove and the second further groove is about 90%–100% of the width of the circumferential groove between the first and second rib and the circumferential groove between the fourth and second rib respectively.

11. The tire according to claim 1, wherein each auxiliary groove extends in the circumferential direction and intersects a second long generally axial groove, the length of the auxiliary circumferential groove being 45%–55% of the circumferential pitch of the first and second lugs and 55%–65% of the circumferential length of a lug block defined by adjacent further grooves.

12. The tire according to claim 11, wherein the auxiliary circumferential groove has a width in a range 55%–65% of the width of one of the circumferential grooves adjacent a center one of the circumferential grooves, and is spaced from an outer circumferential groove by a distance Wc such that Wc is 35%–45% of the width of the lug block.

13. The tire according to claim 12, wherein the depth of the auxiliary circumferential groove is 50%–60% of the depth of a main circumferential groove.

14. The tire according to claim 11, wherein the depth of the second long generally axial groove is 80%–90% of the depth of a main circumferential groove.

15. The tire according to claim 14, wherein the second long groove extends at a slant angle β5 and the slant angle β5 of the second long generally axial groove with respect to the circumferential direction is about $50° < \beta5 < 70°$.

16. The tire according to claim 15, wherein the width of the second long generally axial groove is about 1.6–2.0 times the width L16 of the auxiliary circumferential groove.

17. The tire according to claim 16, wherein an intersection location between the second long generally axial groove and the auxiliary circumferential groove is spaced from one end of the auxiliary circumferential groove by 35%–50% of the circumferential length of the auxiliary circumferential groove.

18. The tire according to claim 2, wherein the ground contacting tread area of the tread pattern includes the additional grooves, the first long grooves, the first short grooves, the second short grooves, the second long grooves, the auxiliary grooves and the generally axial grooves between the lugs respectively having lengths in the generally axial direction of L11, L12, L13, L14, L15, L16, L17 and widths W11, W12, W13, W14, W15, W16, W17, the relative values of the lengths and widths being: L11: L12: L13: L14: L15: L16: L17=1.0: 1.0: 0.4–0.6: 0.4–0.6: 1.0–1.2: 0.1–0.3: 1.0–1.2, W11: W12: W13: W14: W15: W16: W17=1.0: 1.0–1.2: 0.5–0.7: 0.5–0.7: 1.0: 3.2–3.8: 0.5–0.7.

\* \* \* \* \*